United States Patent
Ohab et al.

(10) Patent No.: US 10,422,646 B1
(45) Date of Patent: *Sep. 24, 2019

(54) METHOD AND SYSTEM FOR CREDENTIAL-BASED PEDESTRIAN ROUTING

(71) Applicant: MAPSTED CORP., Mississauga (CA)

(72) Inventors: Henry L. Ohab, Toronto (CA); Paramvir Singh Nagpal, Brampton (CA); Saeedeh Hamidifar, Mississauga (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,758

(22) Filed: Oct. 30, 2018

Related U.S. Application Data

(63) Continuation of application No. 15/955,664, filed on Apr. 17, 2018, now Pat. No. 10,156,447.

(51) Int. Cl.
| | | |
|---|---|---|
| *G01C 21/20* | (2006.01) | |
| *H04W 64/00* | (2009.01) | |
| *H04B 10/114* | (2013.01) | |
| *G01C 21/00* | (2006.01) | |
| *G01S 5/02* | (2010.01) | |

(Continued)

(52) U.S. Cl.
CPC ............. *G01C 21/206* (2013.01); *B60L 3/00* (2013.01); *G01C 21/00* (2013.01); *G01C 21/20* (2013.01); *G01C 21/36* (2013.01); *G01C 21/3617* (2013.01); *G01S 5/0252* (2013.01); *G01S 5/0278* (2013.01); *G06F 17/00* (2013.01); *G06N 5/04* (2013.01); *G06N 20/00* (2019.01);

(Continued)

(58) Field of Classification Search
CPC ...... G01S 5/0252; G01S 19/47; G01S 5/0294; G01S 5/02; G01S 5/0278; G01S 5/0205; G01S 5/0263; H04W 64/00; H04W 4/029; H04W 4/04; H04W 4/33; H04W 64/003; H04W 4/38; H04W 4/043; H04W 8/22; H04W 4/027; H04W 4/046; G01C 21/206; G01C 21/34; G01C 21/3476; H04M 1/72572; H04B 10/1149; H04B 10/116; G08G 1/167; G08G 1/166; G08G 1/165; G08G 1/22; G08G 1/162; G06Q 50/30; G06Q 10/00; G06Q 30/0251; G06Q 40/08; B60K 28/00; G06K 9/00355; G06K 9/00805; B60W 30/09; B60W 30/12; B60W 40/04; H04L 67/12
See application file for complete search history.

(56) References Cited

U.S. PATENT DOCUMENTS

| | | |
|---|---|---|
| 8,538,688 B2 | 9/2013 | Prehofer |
| 2009/0043504 A1 | 2/2009 | Bandyopadhyay et al. |

(Continued)

*Primary Examiner* — Behrang Badii
(74) *Attorney, Agent, or Firm* — Henry L. Ohab

(57) ABSTRACT

A method and a system of providing, for display at a mobile computing device, a pedestrian route associated with an indoor facility. The method comprises localizing the mobile computing device at a first position of the indoor facility, determining a credential associated with the mobile computing device, and communicating, for display at the mobile computing device, the pedestrian route from the first position to at least a second position of the indoor facility, the pedestrian route determined at least partly based on the credential.

20 Claims, 3 Drawing Sheets

(51) Int. Cl.
  *H04W 4/029* (2018.01)
  *G06N 5/04* (2006.01)
  *G01C 21/36* (2006.01)
  *G06F 17/00* (2019.01)
  *B60L 3/00* (2019.01)
  *G06N 99/00* (2019.01)
  *G06N 20/00* (2019.01)

(52) U.S. Cl.
  CPC .......... *G06N 99/00* (2013.01); *H04B 10/1149* (2013.01); *H04W 4/029* (2018.02); *H04W 64/00* (2013.01)

(56) References Cited

U.S. PATENT DOCUMENTS

| | | | |
|---|---|---|---|
| 2011/0144903 A1* | 6/2011 | Gupta | G01C 21/206 701/533 |
| 2011/0176803 A1* | 7/2011 | Song | H04B 10/1149 398/43 |
| 2013/0095849 A1* | 4/2013 | Pakzad | H04W 64/00 455/456.1 |
| 2014/0141796 A1* | 5/2014 | Marti | G01S 5/0252 455/456.1 |
| 2015/0341754 A1* | 11/2015 | Gooch | H04W 4/029 455/456.3 |
| 2016/0379074 A1 | 12/2016 | Nielsen et al. | |
| 2017/0115121 A1* | 4/2017 | MacWilliams | H04W 4/04 |
| 2017/0336516 A1* | 11/2017 | Berkovich | G01S 19/47 |

\* cited by examiner

METHOD AND SYSTEM FOR CREDENTIAL-BASED PEDESTRIAN ROUTING

CROSS-REFERENCE TO RELATED APPLICATION

This application claims the benefit of priority to U.S. application Ser. No. 15/955,664 filed 17 Apr. 2018, which in turn claims benefit of priority to U.S. Provisional Application No. 62/641,676 filed Mar. 12, 2018. The U.S. application Ser. No. 15/955,664 filed 17 Apr. 2018 is hereby incorporated in the entirety herein.

BACKGROUND

Users of mobile devices are increasingly using and depending upon indoor positioning and navigation applications and features. Seamless, accurate and dependable indoor positioning can be difficult to achieve using satellite-based navigation systems when the latter becomes unavailable or sporadically available, such as within enclosed or partly enclosed urban infrastructure and buildings, including hospitals, shopping malls, airports, college buildings, sports arenas and industrial warehouses. Solutions that assist a pedestrian user in planning or navigating a route advance the utility, and ready adoption, of indoor positioning systems.

DETAILED DESCRIPTION

Figure 1:
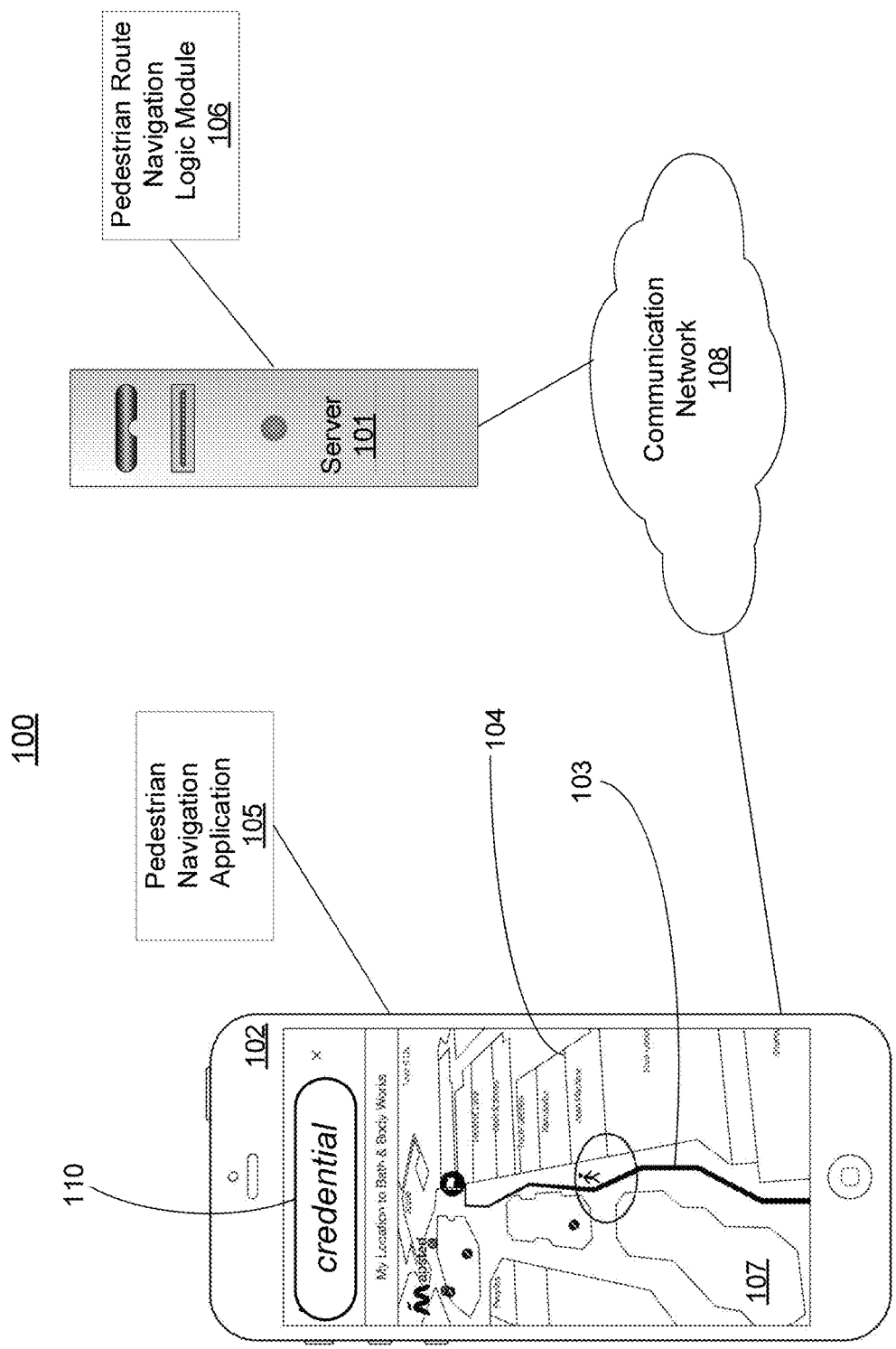
FIG. 1 illustrates, in an example embodiment, a system for credential-based pedestrian routing.

Among other benefits and technical effects, embodiments provided herein provide a user of a carried mobile computing device (also referred to as mobile device herein) with display of a customized pedestrian navigation route based on localizing the mobile device relative to an indoor facility in conjunction with determining a credential assigned to the mobile device. Additional displays of incremental routes or route segments for traversal may be determined, with timely display triggered at the mobile device in accordance with localizing the mobile device at additional locations described by a sequence of times during route traversal. Correspond to the sequence of locations along the route traversed, fingerprint measurements may correlated in time and position with wireless communication signal signatures and mobile device sensor readings along the route that the user's mobile device may traverse relative to the indoor facility or indoor area. In particular, embodiments described here advantageously provide a user in possession of a recognized or designated mobile device with a customized pedestrian navigation path tracked and updated in real-time, commensurate with a credential accorded or assigned to the carried mobile device, for a given indoor facility that is calibrated for fingerprint data established in a fingerprint database.

In particular, a method for displaying, at a mobile computing device, a pedestrian route associated with an indoor facility is provided. The method comprises localizing the mobile computing device at a first position of the indoor facility, determining a credential associated with the mobile computing device, and communicating, for display at the mobile computing device, the pedestrian route from the first position to at least a second position of the indoor facility, the pedestrian route determined at least partly based on the credential.

Also provided is a computing system, which in an embodiment may be a server computing system, for displaying, at a mobile computing device, a pedestrian route associated with an indoor facility. The system includes a memory storing a set of computer instructions that, when executed in a processor, localizes the mobile computing device at a first position of the indoor facility, determines a credential associated with the mobile computing device, and communicates, for display at the mobile computing device, a pedestrian route from the first position to at least a second position of the indoor facility, the pedestrian route determined at least partly based on the credential. In one embodiment, the computer instructions are stored a non-transitory, computer-readable memory of a server computing device.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, wearable devices, tablet devices and laptop computing devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory and magnetic memory. Computers, terminals, network enabled devices (e.g., mobile devices, such as cell phones) are all examples of machines and devices that utilize processors, memory, and instructions stored on computer-readable mediums.

Additionally, embodiments may be implemented in the form of computer-programs, or a computer usable carrier medium capable of carrying such a program.

System Description

FIG. 1 illustrates, in an example embodiment, system 100 for credential-based pedestrian routing in or proximate a pedestrian-accessible facility. Mobile computing device 102, also referred to as mobile device 102 herein, may include pedestrian navigation application 105, and is communicatively connected via communication network 108 to server computing device 101. In one embodiment, mobile device 102 may correspond to, for example, a cellular communication device (e.g., smartphone, tablet, etc.) that is capable of telephony, messaging, and/or data computing services. In variations, mobile device 102 can correspond to, for example, a tablet or a wearable computing device. Mobile device 102 may include a processor, a non-transitory memory, a graphical user interface (GUI) display screen, input mechanisms such as a keyboard or software-implemented touchscreen input functionality, barcode, QR code or other symbol- or code-scanner input functionality. Mobile device 102 may include sensor functionality by way of sensor devices including any of inertial sensors (accelerometer, gyroscope), magnetometer or other magnetic field sensing functionality, and barometric or other environmental pressure sensing functionality. Mobile device 102 may also include capability for detecting and communicatively accessing wireless communication signals, including but not limited to any of Bluetooth, Wi-Fi, RFID, and GPS signals. Mobile device 102 further includes the capability for detecting and measuring a received signal strength of the wireless communication signals. In other variations, mobile device 102 may include location determination capability such as by way of a Global Positioning System (GPS) location data capability, and may be communicatively coupled to communication network 108, such as by sending and receiving cellular data over data and voice channels.

Pedestrian navigation application 105, in one embodiment, may be a software application that is downloaded, such as from server computing device 101, installed, and stored in a non-transitory memory of mobile device 102. During execution, for example in a processor of mobile device 102, of computer instructions that constitute pedestrian navigation application 105, physical layout map 107 of an indoor facility or building being traversed by a user in possession of mobile device 102 may be displayed within a graphical user interface (GUI) display of mobile device 102. The term pedestrian as used herein is intended to encompass not only walking pedestrians, but also users moving at typical pedestrian speeds, for example at typically less than 10 miles per hour, using automated means such as automated wheelchairs or automated people-moving indoor carts and similar automated people-moving systems. The terms indoor facility or building as used herein means an at least partially enclosed building having at least one fixed boundary, such as an exterior boundary wall.

Display of physical layout map 105 may further show pedestrian trajectory or pedestrian route 103 traversed by mobile device 102, and may include a recommended or anticipated route for traversal or pedestrian navigation by a user carrying mobile device 102. The GUI display of mobile device 102 may include input means enabling a user in possession of mobile device 102 to manually enter credential code 110 or similar unique identification assigned for association with mobile device 102. In other embodiments, credential code 110 may be uniquely associated with mobile device 102 upon download and installation of pedestrian navigation application 105 in a memory of mobile device 102, then made available automatically for usage in conjunction with pedestrian route navigation operations as described herein. Physical layout map 107 may further depict one or more layout physical features 104, such as internal walls, meeting and conference rooms or other internal building physical features including a doorway, a facility exit, a physical marker fixed in place, a facility entrance, a stairwell, a stairway, a corridor, an elevator, an external boundary outline of the indoor facility, and internal physical partitions. In one embodiment, the indoor area includes multiple floors, and the recommended pedestrian route may include a route portion for transitioning, whether by stairs or automated means including an elevator or escalator, from one floor to another of the multiple floors.

Credential 110, which may be a unique credential code in one embodiment, is not limited to manually entered credential 110, may be assigned based on considerations such as, but not limited to, a security or entitlement level, or familiarity with the facility, for instance in a university or college campus setting, the credential may establish such as one of faculty staff, student or maintenance staff. In other embodiments, the credential 110 may be assigned based on a physical capability or a physical handicap of a user associated with a given mobile computing and communication device, or on a assigned on a temporary, single-use or single-transaction basis for a visitor in accompaniment of mobile device 102 to the indoor facility. In some embodiments, credential 110 may be encoded within a communication or a hyperlink, such as within an email or text message or other text string received at mobile device 102, and only becomes associated with mobile device 102 once the user selects or activates at least a portion of the text string. In a further variation, if mobile device 102 does not already include pedestrian navigation application 105, or a latest version of pedestrian navigation application 105, the latter may be downloaded and installed automatically at mobile device 102 once the user selects or activates at least a portion of the text string received at mobile device 102. The text string, in one embodiment, may presented in a meeting invite sent in an email or text message communication received at mobile device 102. Credential 110 may be assigned to be timing- or time-constrained such as for a single-event, for example for a prospective interviewee that receives an interview schedule sent in an invite by email or text communication, the interview being performed on-site at a particular indoor facility or building. In the latter case, credential 110 as assigned may be valid for operation only during a particular time period or time slot during a particular date, for the given interview calendar event as scheduled.

Figure 2:
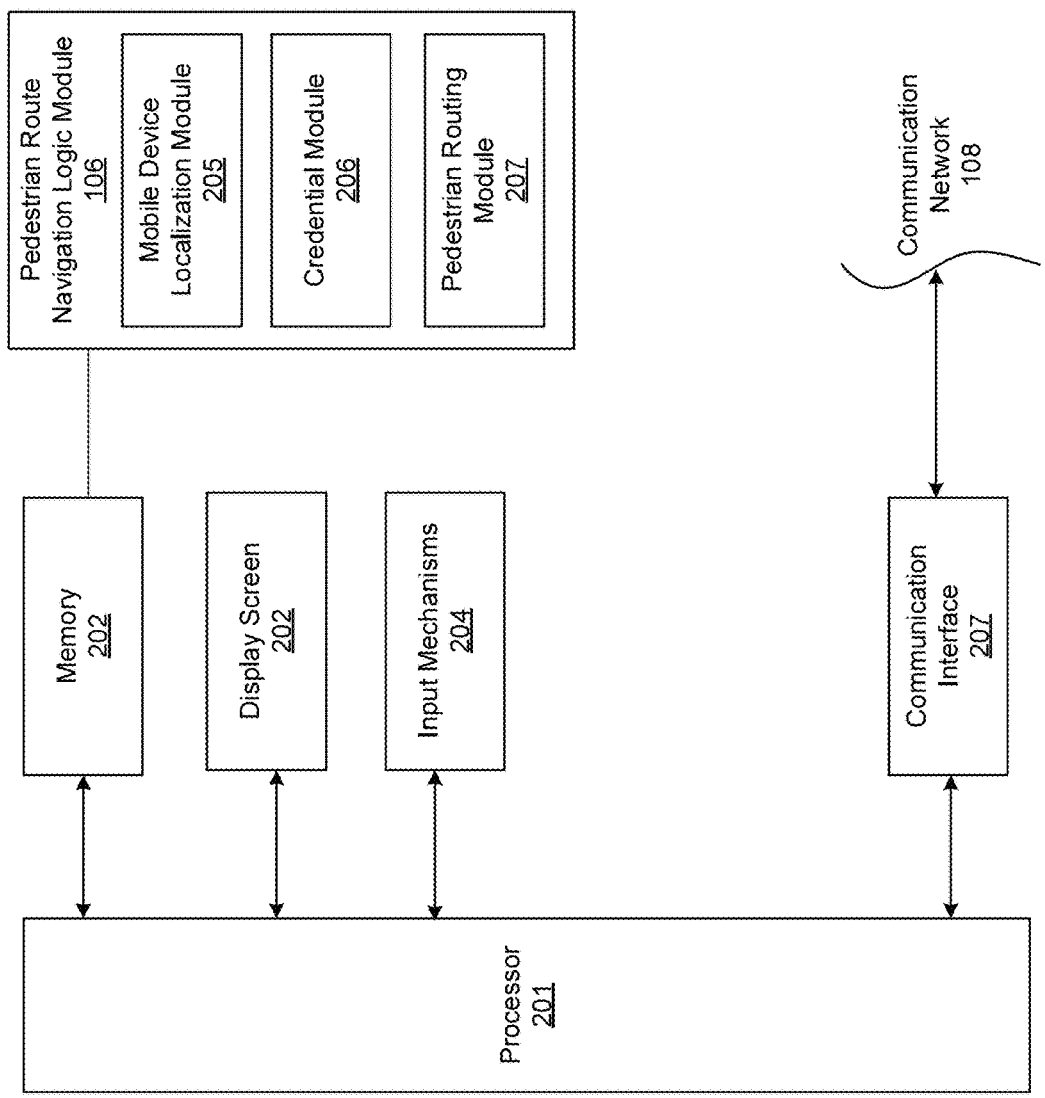
FIG. 2 illustrates an example architecture of a computing and communication server device for use with a credential-based pedestrian routing system.

FIG. 2 illustrates an example architecture of computing and communication server device 101, also referred to herein as server 101, for use with credential-based pedestrian routing system 100. Server 101, in embodiment architecture 200, may be implemented on one or more server devices, and includes processor 201, memory 202 which may include a read-only memory (ROM) as well as a random access memory (RAM) or other dynamic storage device, display screen or device 203, input mechanisms 204 and communication interface 207 communicatively coupled to communication network 107. Processor 201 is configured with software and/or other logic to perform one or more processes, steps and other functions described with implementations, such as described by FIG. 1 through FIG. 3 herein. Processor 201 may process information and instructions stored in memory 202, such as provided by a random access memory (RAM) or other dynamic storage device, for storing information and instructions which are executable in processor 201.

Pedestrian route navigation logic module 106 of mobile device 102 may include processor-executable instructions stored in RAM, in one embodiment, in memory 202, and may be constituted of sub-modules including mobile device localization module 205, credential module 206, and pedestrian routing module 207.

Fingerprint data stored in a database on server 101 may be used to track a mobile device 102 traversal along trajectory or route 103 within, and even adjoining, the indoor facility or area, by localizing mobile to particular positions according to the fingerprint data. The area may be an indoor area within a shopping mall, an airport, a warehouse, a sports arena, a university campus, or any at least partially enclosed building. In embodiments, the fingerprint data, as acquired from mobile device 102, further includes respective time-stamps, whereby the orientation, the magnetic field strength and direction, the received wireless signal strength, the barometric pressure, and the position data can be time-correlated for any given position along a trajectory or trajectory segment of the mobile devices, in accordance with the respective time-stamps. In embodiments, the fingerprint map data, which may be hosted in server 101 and made communicatively accessible to mobile device 102 via communication network 108, in one embodiment, further associates particular positions along route 103 with any combination of fingerprint data, including gyroscope data, accelerometer data, wireless signal strength data, wireless connectivity data, barometric data, acoustic data, line-of sight data, and ambient lighting data, in addition to magnetic data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint may include a correlation of sensor and signal information (including, but not necessarily limited to wireless signal strength, magnetic or barometric information, inertial sensor information) associated for a unique location relative to the facility. Thus, fingerprint data associated with a particular location or position may provide a fingerprint signature that uniquely correlates to that particular location or position, and localize the mobile device at a particular position or location along a trajectory of motion across the indoor area based on that fingerprint signature.

Processor 201 uses executable instructions stored in credential module 206 to add the route activity data of mobile device 102 to accumulated route navigation data associated with the graphical icon representing a navigation profile option as selected by a user at mobile device 102. The accumulated route navigation data may comprise prior route activity data pertaining to respective mobile devices that have historical, or prior traversals, of the indoor area. In one embodiment, the accumulated route navigation data may be stored at a database that is communicatively accessible over communication network 108 to mobile device 102 and server computing device 101.

Credential module 206 may include, or be enabled with access to, a database, such as a positioning fingerprint database hosted at remote server 101, that stores accumulated trajectory information of mobile devices which have previously or historically traversed the given indoor area. The trajectory information may include route activity data, such as the specific sequence of positions constituting a route taken by the respective mobile devices, in conjunction with dwell times of the respective mobile devices at positions along the sequence of positions constituting the mobile device trajectory, or route traversed, within the indoor area.

In an embodiment, mobile devices' historical trajectory information stored in server 101 for use in conjunction with credential module 206 may be organized such that the trajectory information may be associated with respective ones of credential 110 as might be assigned to or presented by mobile device 102 prior to traversing a pedestrian route within the indoor area.

Fingerprint data of the indoor facility as stored in a fingerprint database of, or accessible to, server 101 for use in conjunction with credential module 206 may include fingerprint data mapped at least in part using sensor devices 205 during traversal of the indoor area by mobile devices, the sensor devices 205 including but not limited to an accelerometer, a gyroscope, a magnetometer, a barometer, and a wireless signal strength sensor. The fingerprint data may include any one of orientation data, a magnetic field data including strength and direction, received wireless signal strength data, barometric pressure data, and also GPS location data at a given position within the indoor facility or area for such mobile devices cumulatively. The fingerprint data may be time-stamped for time-correlations with respective positions traversed along a given indoor area. In recording the time-stamped magnetic field information and wireless radio signals, such data acquired at mobile device 102 may be matched, or localized, to coordinate positions along mobile device trajectory 102 of the indoor area.

The terms position or location as used herein refers to a coordinate location expressed in local or global (X, Y) coordinate terms. In some embodiments, the coordinates may further include a Z coordinate representing a height, for example associated with a given floor within a multi-floor building, and thus expressed in (X, Y, Z) coordinate terms.

Processor 201 uses executable instructions stored in pedestrian routing module 207 to communicate, for display at mobile computing device 102, pedestrian route 103 from a first position to at least a second position associated with the indoor facility, pedestrian route 103 being determined at least partly based on the credential.

Methodology

Figure 3:
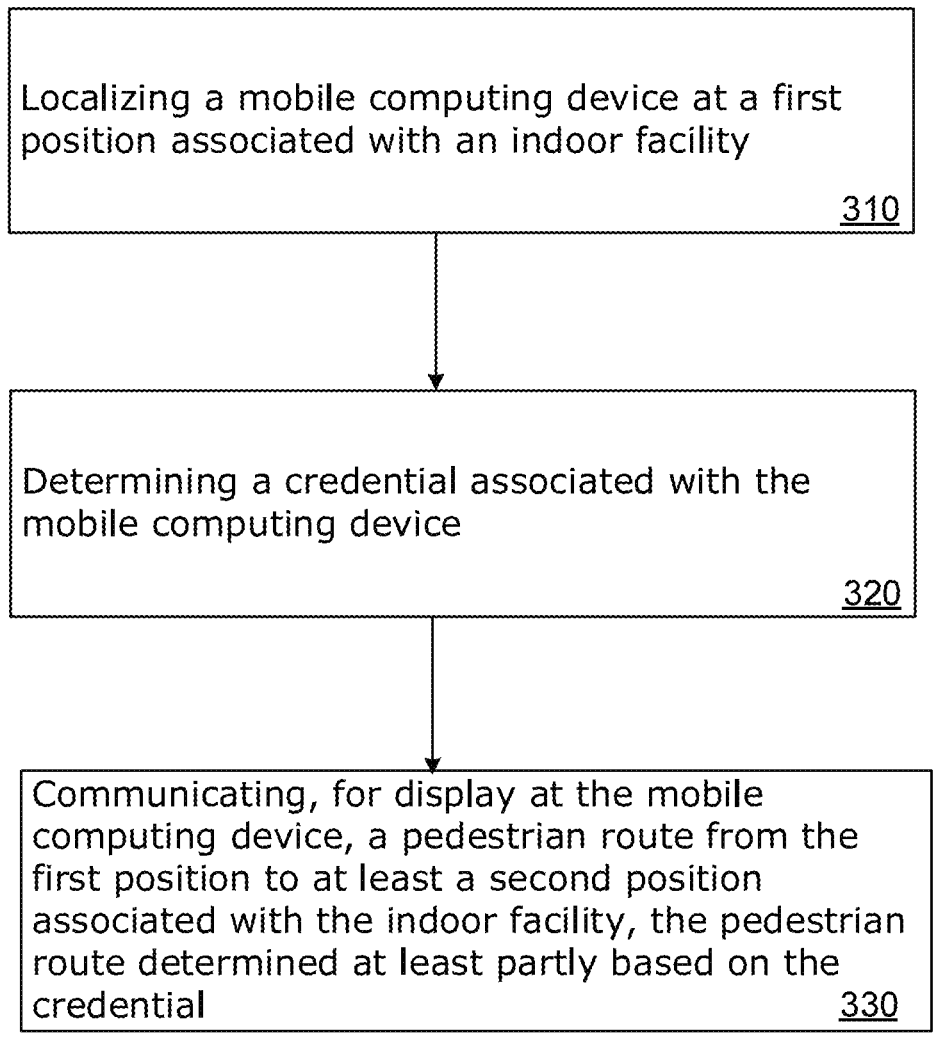
FIG. 3 illustrates, in an example embodiment, a method of operation of a credential-based pedestrian routing system.

FIG. 3 illustrates, in an example embodiment, method 300 of operation of credential-based pedestrian routing system 100 associated with a pedestrian-accessible facility. In describing examples of FIG. 3, reference is made to the examples of FIGS. 1-2 for purposes of illustrating suitable components or elements for performing a step or sub-step being described.

Examples of method steps described herein are related to the use of server 101, which may host a database accessible to credential module 206 in one embodiment, for storing accumulated historical mobile device navigation information related to the indoor area. According to one embodiment, the techniques are performed the processor 201 executing one or more sequences of software logic instructions that constitute pedestrian route navigation logic module 106 of mobile device 102. In embodiments, pedestrian route navigation logic module 106 may include the one or more sequences of instructions within sub-modules including mobile device localization module 205, credential module 206 and pedestrian routing module 207. Such instructions may be read into memory 202 from machine-readable medium, such as memory storage devices. Execution of the sequences of instructions contained in mobile device localization module 205, credential module 206 and pedestrian routing module 207 of pedestrian route navigation logic module 106 in memory 202 causes processor 201 to perform the process steps described herein. It is contemplated that, in some implementations, some of the sub-modules, or any other portions of executable instructions constituting pedestrian route navigation logic module 106, may be hosted at server 101 rather than mobile device 102. In alternative implementations, at least some hard-wired circuitry may be used in place of, or in combination with, the software logic instructions to implement examples described herein. Thus, the examples described herein are not limited to any particular combination of hardware circuitry and software instructions.

At step 310, based upon processor 201 executing the computer code or instructions of mobile device localization module 205, localizing mobile computing device 102 at a first position associated with the indoor facility. Server 101 in conjunction with mobile device 102 may localize mobile device 102 to particular coordinate positions within the indoor facility, based on fingerprint measurements correlated in time and position with wireless communication signal signatures and mobile device 102 sensor readings, such as at an entrance or first position relative to the indoor facility or indoor area, where the latter is calibrated for fingerprint data established in a fingerprint database accessible to at least one of server 101 and mobile device 102.

At step 320, upon processor 201 executing the instructions of mobile device localization module 205, determining a credential 110, for instance including but not limited to an at least partly alphanumeric credential code, associated with mobile computing device 102. In embodiments, determining the credential may be based on comparing a unique identifier of the mobile computing device with a database of credentials assigned to a set of mobile devices. The unique identifier may be such as a phone number associated with mobile device 102, a credential code embodied in a text string or a bar code symbol communicated, including in an email or text message, to mobile device 102 and made accessible to server 101 from a memory of mobile device 102, a credential code acquired by mobile device 102 such as by scanning an encoded image or alphanumeric text, or a credential code 110 manually entered into an input area of a GUI of mobile device 102.

In embodiments, credential 110 may be configured to be temporally-dependent, and timing- or time-constrained such as for a single-even at a specific time or times according to a schedule, for example for a prospective interviewee that receives an interview schedule sent in an invite by email or text communication, the interview being performed on-site at a particular indoor facility or building, in accordance with specifically designated start times and time slot durations. In the latter case, credential 110 as assigned or determined at server 101 may be valid and operable in conjunction with localization of mobile device 102 only during a particular time period or event start time during a particular date, such as for the given interview event as scheduled. In other embodiments, credential 110 may be configured to change from a first credential code or value to a second credential code or value based on occurrence of a temporal condition, such as but not limited to a time of day. Consequently, the pedestrian route determined at server 101 and communicated to mobile device 102 for route display thereon may vary in accordance with change in credential based on the temporal condition then—prevailing at a time of localization of mobile device 102.

At step 330, upon processor 201 executing the instructions of mobile device localization module 205, communicating, for display at mobile computing device 102, pedestrian route 103 from the first position to at least a second position associated with the indoor facility, pedestrian route 103 being determined at least partly based on the credential. In embodiments, the pedestrian route is determined at server 101 by proposing a path commensurate with determined credential 110 of mobile device 102. In examples, where the indoor facility is a sports area, upon localizing mobile device 102 at a particular location of the sports arena, server 101 may use a code representing an assigned electronic event seat ticket presented at mobile device 102 to determine and communicate, for display at a GUI of mobile device 102, an indoor route that avoids certain seating sections of the sports arena, the route representing a pedestrian path from the position of mobile device 102 as localized to the assigned seat location in accordance electronic event seat ticket presented. Although functionality pertaining to steps 310, 320 and 330 are primarily described as performed by server 101, it is contemplated that in alternate embodiments, at least some portions of the functionality of mobile device localization module 205 and credential module 206 may be performed at mobile device 102, in communication and in conjunction with server 101.

In another embodiment, where the indoor facility includes multiple floors, and the first position, or entrance position, of mobile device 102 as localized is situated on a first of the multiple floors, with a destination position determined as being situated on another of the multiple floors, and the credential presented by mobile device 102 is associated with, or includes an indication of, a physical handicap attribute, the pedestrian route determined and communicated by server 101 for display at mobile device 102 may avoid sets of stairs and escalators in favor of an elevator, for example, within the indoor facility.

In embodiments, a pedestrian route from the first position as localized, such as at an entrance to the building, to a first scheduled location or meeting room within may be presented for display at mobile device 102. Then additional or incremental routes corresponding to route from current locations to a subsequent interview slot location may be presented in the route navigation sequence correlated with start times of various interview slots. Each scheduled interview slot may include a dwell time in accordance with a sequence of locations constituting the interview process as scheduled. For instance, positions or locations along the mobile device trajectory may correspond with scheduled times, such as for an interviewee candidate associated with mobile computing device 102, who, as first-time visitors to the facility, may be unfamiliar with specific office locations and meeting rooms scheduled at respective interview slots in a series of on-site interviews scheduled at the pedestrian facility or building. Additional displays of incremental and subsequent routes or route segments may be determined, then communicated and triggered for timely display at the mobile device in accordance with localizing the mobile device at respective ones of the sequential locations at a sequence of times, taking into account anticipated dwell times at locations in accordance with interview time slots as scheduled. It is contemplated that many other such credential groups may be designated and provided, such as for children or other designated groupings, with credentials being assigned accordingly based on the groupings as designated.

It is contemplated that embodiments described herein extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method of providing, for display at a mobile computing device, a pedestrian route associated with an indoor facility, the method comprising:
    obtaining a unique identifier of the mobile computing device;
    comparing the unique identifier of the mobile computing device with a database to determine a credential associated with the mobile computing device, the database comprising credentials assigned to a set of mobile devices, each credential having trajectory information associated with it, based on a user attribute associated with the mobile device; and
    communicating, for display at the mobile computing device, the pedestrian route from a first position of the mobile computing device in the indoor facility to a second position in the indoor facility, the pedestrian route determined at least partly based on the trajectory information associated with the credential.

2. The method of claim 1 wherein the method further comprises associating, based on the user attribute, the credential with the mobile computing device upon installing a pedestrian navigation application in a memory of mobile computing device, wherein the credential is subsequently used for navigating a user of the mobile computing device in the indoor facility.

3. The method of claim 1 wherein the user attribute is at least one of a security level, an entitlement level, a familiarity with the indoor facility, and a physical capability of a user.

4. The method of claim 1 wherein the indoor facility includes multiple floors, the first position is situated on a first of the multiple floors, and the second position is situated on a second floor of the multiple floors, and wherein the credential pertains to a physical handicap pedestrian route, and the pedestrian route from the first position to the second position avoids one of a set of stairs and an escalator within the indoor facility.

5. The method of claim 1 wherein the credential is encoded in at least one of a barcode symbol and a text string received at the mobile device via one of an email and a text message.

6. The method of claim 1 wherein the method comprises localizing the mobile computing device to the first position, based on fingerprint data associated with the indoor facility.

7. The method of claim 1 wherein the credential as configured is temporally-dependent.

8. The method of claim 7 wherein the credential is operable only for at least one of a predetermined start time, a predetermined duration, and a predetermined date.

9. The method of claim 1, wherein the method comprises accumulating route activity data of mobile computing devices traversing the indoor facility in the database, the trajectory information corresponding to the credential including the route activity data.

10. The method of claim 1 wherein the credential is a first credential, and the first credential changes to a second credential based on occurrence of a temporal condition.

11. A server computing system providing, for display at a mobile computing device, a pedestrian route associated with an indoor facility, the server computing system comprising:
    a processor; and
    a memory storing a set of instructions, the instructions executable in the processor to:
    obtain a unique identifier of the mobile computing device;
    compare the unique identifier of the mobile computing device with a database to determine a credential associated with the mobile computing device, the database comprising credentials assigned to a set of mobile devices, each credential having trajectory information associated with it, based on a user attribute associated with the mobile device; and
    communicate, for display at the mobile computing device, the pedestrian route from a first position of the mobile computing device in the indoor facility to a second position in the indoor facility, the pedestrian route determined at least partly based on the trajectory information associated with the credential.

12. The server computing system of claim 11 wherein the processor is to associate, based on the user attribute, the credential with the mobile computing device upon installing a pedestrian navigation application in a memory of mobile computing device, wherein the credential is subsequently used for navigating a user of the mobile computing device in the indoor facility.

13. The server computing system of claim 11 wherein the indoor facility includes multiple floors, the first position is situated on a first of the multiple floors, and the second position is situated on a second floor of the multiple floors, and wherein the credential pertains to a physical handicap pedestrian route, and the pedestrian route from the first position to the at least a second position avoids one of a set of stairs and an escalator within the indoor facility.

14. The server computing system of claim 11 wherein the credential is encoded in at least one of a barcode symbol and a text string received at the mobile device via one of an email and a text message.

15. The server computing system of claim 1 wherein the user attribute is at least one of a security level, an entitlement level, a familiarity with the indoor facility, and a physical capability of a user.

16. The server computing system of claim 11 wherein the processor is localize the mobile computing device to the first position, based on fingerprint data associated with the indoor facility.

17. The server computing system of claim 11 wherein the credential as configured is temporally-dependent, and wherein the credential is operable only for at least one of a predetermined start time, a predetermined duration, and a predetermined date.

18. The server computing system of claim 11, wherein the processor is to accumulate route activity data of mobile computing devices traversing the indoor facility in the database, the trajectory information corresponding to the credential including the route activity data.

19. The server computing system of claim 11 wherein the credential is a first credential, and the first credential changes to a second credential based on occurrence of a temporal condition.

20. A non-transitory computer-readable medium storing instructions executable in a processor of a computing device, the instructions when executed causing the processor to perform operations comprising:

obtain a unique identifier of the mobile computing device;

compare the unique identifier of the mobile computing device with a database to determine a credential associated with the mobile computing device, the database comprising credentials assigned to a set of mobile devices, each credential having trajectory information associated with it, based on a user attribute associated with the mobile device; and communicate, for display at the mobile computing device, the pedestrian route from a first position of the mobile computing device in the indoor facility to a second position in the indoor facility, the pedestrian route determined at least partly based on the trajectory information associated with the credential.

\* \* \* \* \*